United States Patent
Augesky

(10) Patent No.: US 9,768,702 B2
(45) Date of Patent: *Sep. 19, 2017

(54) CONVERTER WITH POWER FACTOR CORRECTION

(75) Inventor: Christian Augesky, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 1028 days.

This patent is subject to a terminal disclaimer.

(21) Appl. No.: 13/513,011

(22) PCT Filed: Nov. 22, 2010

(86) PCT No.: PCT/EP2010/067875
§ 371 (c)(1),
(2), (4) Date: May 31, 2012

(87) PCT Pub. No.: WO2011/067127
PCT Pub. Date: Jun. 9, 2011

(65) Prior Publication Data
US 2012/0230068 A1    Sep. 13, 2012

(30) Foreign Application Priority Data
Dec. 2, 2009  (AT) .................................. 1906/2009

(51) Int. Cl.
H02M 3/335 (2006.01)
(52) U.S. Cl.
CPC ....... *H02M 3/33569* (2013.01); *H02M 3/335* (2013.01); *Y02B 70/1433* (2013.01)
(58) Field of Classification Search
CPC ...... H02M 3/33523; H02M 1/12; H02M 1/44; H02M 1/4225; H02M 1/4258;
(Continued)

(56) References Cited

U.S. PATENT DOCUMENTS

| 4,280,174 A | 7/1981 | Sonda |
| 4,736,284 A | 4/1988 | Yamagishi et al. |

(Continued)

FOREIGN PATENT DOCUMENTS

| CN | 1545195 | 11/2004 |
| CN | 101018007 | 8/2007 |

(Continued)

OTHER PUBLICATIONS

Zhang Feng, Zhang Xiubin School of Electrical & Information Engineering Shanghai Jiaotong University Shanghai, Chia 200030, Tamotsu-Ninomiya; Jin Chunfeng, School of Information Science & Electrical Engineering Kyushu University, Fuknoka, Japan 812-8581; "A Novel Common-source Type Single-stage PFC Converter" The 4th International Power Electronics and Motion Control Conference; 2004, IPEMC, Band 3; Seiten 1080-1084, Kapitel II, III.

*Primary Examiner* — Emily P Pham
*Assistant Examiner* — Shahzeb K Ahmad
(74) *Attorney, Agent, or Firm* — Cozen O'Connor

(57) ABSTRACT

A converter for converting an input-side alternating current into an output-side DC current, with a power factor correction being provided, wherein the converter comprises a transformer having at least two serially arranged primary windings, a first switch is used to switch a storage capacitor unit in series with a first primary winding to the alternating current in a clocked manner via rectification elements and a second primary winding is switchable to the storage capacitor unit in a clocked manner by a second switch.

14 Claims, 5 Drawing Sheets

(58) Field of Classification Search
CPC .. H02M 3/335; H02M 3/33507; H02M 3/337; G05F 1/14; Y02B 70/126
USPC ....... 363/44, 45, 47, 48, 125, 126, 127, 133, 363/134; 323/255
See application file for complete search history.

(56) References Cited

U.S. PATENT DOCUMENTS

| | | | |
|---|---|---|---|
| 5,224,025 | A | 6/1993 | Divan et al. |
| 5,751,561 | A | 5/1998 | Ho et al. |
| 5,757,626 | A | 5/1998 | Jovanović et al. |
| 2003/0227784 | A1 | 12/2003 | Qiao et al. |
| 2004/0252528 | A1* | 12/2004 | Kuwabara ................. 363/21.07 |
| 2005/0018455 | A1* | 1/2005 | Ceruti et al. ............... 363/56.09 |
| 2009/0316444 | A1* | 12/2009 | Yamaguchi et al. ....... 363/21.12 |
| 2010/0265231 | A1* | 10/2010 | Jang ............................. 345/211 |

FOREIGN PATENT DOCUMENTS

| | | |
|---|---|---|
| JP | 4244781 | 9/1992 |
| JP | 4265666 | 9/1992 |
| JP | 2001119934 | 4/2001 |

\* cited by examiner

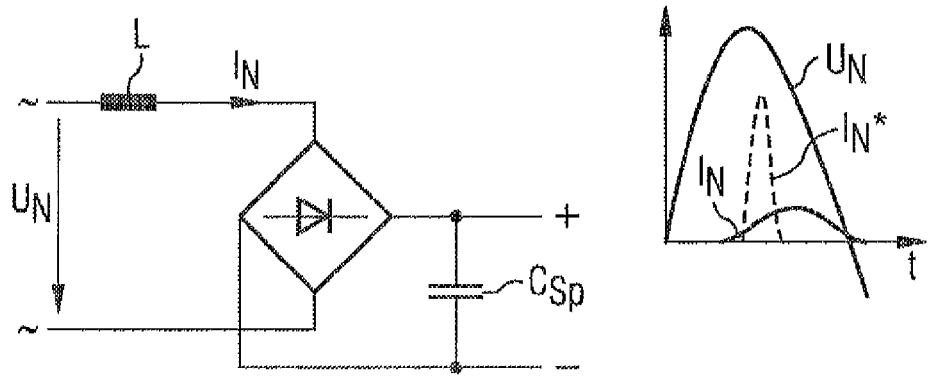
FIG 1 -- Prior Art --
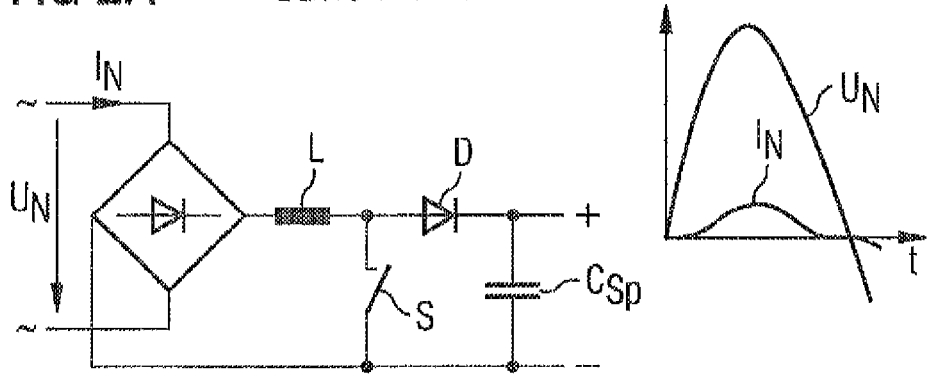
FIG 2A -- Prior Art --
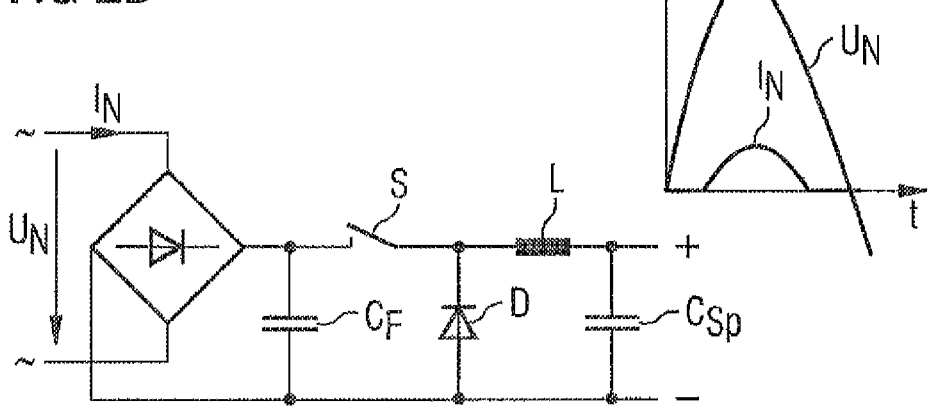
FIG 2B -- Prior Art --

CONVERTER WITH POWER FACTOR CORRECTION

CROSS-REFERENCE TO RELATED APPLICATIONS

This is a U.S. national stage of application No. PCT/EP2010/067875 filed Nov. 22, 2010. Priority is claimed on Austrian Application No. A1906/2009 filed Dec. 2, 2009, the content of which is incorporated herein by reference in its entirety.

BACKGROUND OF THE INVENTION

1. Field of the Invention

The invention relates to voltage convertors and, more particularly, to a converter for converting an input-side alternating voltage into an output-side direct voltage, where a power factor correction is provided and the converter comprises a transformer having at least two primary windings arranged in series. The invention also relates to a method for operating such a converter.

2. Description of the Related Art

Converters used in conventional commercial or mains power supplies usually have extremely harmonically polluted input currents or, as the case may be, a power factor that is significantly under unity. The reason for this lies in the requirement to recharge a storage capacitor on the direct current side by a rectifier on the alternating current side. As a result, short, needle-shaped current peaks are created. Without additional measures, the height of the current peaks is limited only by the internal resistances of an input-side power grid, a power grid line filter, a rectifier and a storage capacitor.

According to the prior art, a technique known as power factor correction (PFC) is provided to reduce a fraction of interfering harmonic components in the current draw of a converter.

Passive power factor correction is achieved by a high input inductance (FIG. 1). The large inductance value is necessary to increase the current flow angle significantly during a recharging phase. This makes sense only in the case of small power ratings, because otherwise the corresponding chokes will be too large and heavy. Apart from the costs of the chokes, their power dissipation loss needs to be taken into account.

This method is little suited for wide ranges of input voltage due to the variance of the maximum input current associated therewith.

Alternatively thereto, an active form of power factor correction is known in which a separate converter stage correctively adjusts the consumed current to the time characteristic of a sinusoidally varying power supply voltage. Such active PFC circuits are generally embodied as step-up converters and are connected directly downstream of a rectifier (FIG. 2a). They charge a large capacitor to a voltage above the peak voltage of the input alternating voltage. The step-up converter operates at a considerably higher frequency than a power grid supply, as a result of which a much smaller inductance is required. An approximately continuous current flow is produced with a low current ripple factor, the average current being adjusted by a control circuit to the value of the power supply voltage at a given instant in time.

Although an active PFC circuit is more complex and costly than passive power factor correction, higher levels of efficiency and superior harmonic suppression are possible. A disadvantageous aspect apart from the cost and complexity is that, due to its operating principle, the output voltage of such a PFC circuit lies above the maximum power supply voltage. As a result, problems can occur in relation to component loads and insulation voltages, especially at high power supply input voltages.

Instead of a step-up converter, an active PFC circuit can include a step-down converter to which an output voltage less than the power supply voltage is applied (FIG. 2b). This does, however, lead to a reduction in the possible current flow angle. The energy input into a storage capacitor can only be accomplished with a power supply voltage that is greater than the voltage at the storage capacitor. Furthermore, the current ripple factor is higher than in the case of a solution comprising a step-up converter and it is easier to control a ground-side power switch in the case of a step-up converter.

JP 2002 315 327 A discloses a flyback converter having a transformer which comprises two primary-side windings. This converter implementation is likewise directed toward power factor correction. A connecting point between the primary-side windings is connected to a reference potential by a smoothing capacitor. In this arrangement, the first primary winding is arranged in series with the smoothing capacitor and connected to a rectified input alternating voltage. The second primary winding is connected in series with a switch at the smoothing capacitor. When the switch is turned on, energy is initially loaded from the smoothing capacitor into the transformer by the second primary winding, with a voltage also building up in the first primary winding. After the switch is turned off, energy from the input is initially stored in the smoothing capacitor by the first primary winding and then the energy still stored in the transformer is output on the secondary side. The input current is regulated in this case by the transformer saturation. In addition to having a narrow input voltage range, a converter of this type is subject to undesirable losses due to the charge reversal operations.

SUMMARY OF THE INVENTION

It is therefore an object of the invention to provide an improved converter for converting an input-side alternating voltage into an output-side direct voltage.

This and other objects and advantages are achieved in accordance with the invention by a converter and a method for operating the converter in which a storage capacitor unit arranged in series with a first primary winding can be connected to the alternating voltage by rectification elements in a clocked manner by a first switch, and a second primary winding can also be connected to the storage capacitor unit in a clocked manner by a second switch. In this way, a converter is disclosed by which energy is transferred from the input to the output in a particularly low-loss manner by a controllable power factor correction. In this case, the operating principle of a flyback converter is combined with that of a step-down converter, with no additional inductor being provided. The primary-side winding is implemented in a divided configuration and the primary winding on the power grid side in combination with the first switch and the storage capacitor unit forms a step-down converter.

A PFC functionality is achieved without the addition of a further converter stage and without a further large inductor. All of the energy transferred to the secondary side is buffered only once in the transformer because the storage capacitor unit is charged directly from a power grid connected on the input side. Accordingly, the entire converter arrangement in accordance with the invention has a high level of efficiency.

A further advantage is that the voltage present at the first switch and at the first primary winding is equivalent only to the difference from rectified input voltage and the voltage present at the storage capacitor unit. The load to which the components are subjected is accordingly kept low even at high input voltages. Consequently, the investment of resources required to protect against power grid transients can also be reduced, in particular in combination with a switchable freewheeling arrangement of the first primary winding.

A very wide input voltage range is covered by an appropriate alignment of the voltage of the storage capacitor unit to the input voltage. The voltage present at the storage capacitor unit is predetermined as low at a small input voltage and high at a large input voltage. A wide range capability is therefore realized without switchover, i.e., without the necessity to provide a voltage doubler.

Furthermore, the converter in accordance with the invention is fundamentally suitable for quasi-resonant switching operation with discrete discharging or resonant capacitors. On the one hand, efficiency is increased further by such a switching mode of operation and, on the other hand, the occurrence of high-frequency interference is significantly reduced.

In accordance with the method of the invention, energy supplied on the input side in a first charging phase of an operating cycle is stored in the transformer and in the storage capacitor unit by the first primary winding and in a second charging phase electrical energy drawn from the storage capacitor unit is stored in the transformer by the second primary winding. The energy introduced into the transformer by the first primary winding during a conducting phase of the first switch is not reloaded into the storage capacitor unit but is output on the secondary side. During a conducting phase of the first switch, the current flowing through the first primary winding additionally charges the storage capacitor unit. With the second switch turned on, the energy thus stored is loaded into the transformer by the second primary winding and output on the secondary side. There is therefore no lossy reverse storing of energy from the transformer back into the storage capacitor unit. The energy stored in the transformer is output directly to the secondary side of the converter.

In an advantageous embodiment of the converter, a filter capacitor unit is included, which is connected to a conductor of the alternating voltage and downstream of which rectification elements are arranged. Here, the filter capacitor unit serves for smoothing and is dimensioned so as to be smaller in size than conventional buffer input capacitors.

For the secondary-side embodiment of the converter, it is of advantage if the transformer includes at least one secondary winding to which an output capacitor is connected by a secondary-side rectifier circuit. The secondary-side rectifier circuit favorably consists of a rectifier diode.

On the primary side, it is provided in an advantageous embodiment that the first switch is arranged in series with the series circuit consisting of first primary winding and storage capacitor unit and that the second switch is arranged in series with the second primary winding. This simple layout allows simple dimensioning of the individual components and permits a compact design.

In a simple structure, the storage capacitor unit is furthermore arranged such that a connection between the two primary windings is connected to a terminal of the storage capacitor unit and that its second terminal is connected to a primary-side reference potential. It is favorable in this case if the series circuit consisting of second primary winding and second switching element is arranged in parallel with the storage capacitor unit.

In another advantageous embodiment, a freewheeling diode is arranged in parallel with the series circuit consisting of first primary winding and storage capacitor unit, the storage capacitor unit is connected to a reference potential by the first switch, in particular in series with a first current-sensing resistor, and the second primary winding is connected to the same reference potential by the second switch, in particular in series with the first and a second current-sensing resistor. In this arrangement, the first switch can remain turned on during the conducting phase of the second switch, as a result of which a simplified form of control is realized.

In a further advantageous embodiment, the first switch comprises a first and a second switching element, the first primary winding is subdivided into a first and a second part-winding, the first part-winding is connected in series with the first switching element and with a positively charged storage capacitor to the alternating voltage by a first rectifier element and the second part-winding is connected in series with the second switching element and a negatively charged storage capacitor to the alternating voltage by a second rectifier element. In this arrangement, the rectification elements are reduced to two rectifier diodes.

In an advantageous embodiment, a third switching element is arranged in a freewheeling path of the first primary winding, thereby realizing a switchable freewheeling mode for the primary winding.

When operating the converter, it is advantageously provided that during a charging phase the first switch is initially turned on and the second switch is turned off and subsequently the second switch is turned on and the first switch is turned off, and the second switch remains turned on until such time as a current through the second switching element reaches a predetermined threshold value. The transfer of energy is therefore controlled by the primary-side current. Here, the threshold value of the primary-side current is predetermined by a secondary-side regulation of the voltage.

In this case, it is furthermore advantageous if the ratio of the turn-on times of the first and second switch is regulated such that the voltage at the storage capacitor unit remains constant on average. The state of equilibrium of the storage capacitor unit is therefore regulated independently of the secondary-side voltage regulation and the switch-off control of the primary-side current. The actuating variable of the second slower regulatory circuit is formed by the turn-on time of the first switch.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below in an exemplary manner with reference to the attached schematic figures, in which:

FIG. 1 shows a converter circuit in accordance with the prior art having input inductance;

FIG. 2a shows an active PFC circuit in accordance with the prior art, embodied as a step-up converter;

FIG. 2b shows an active PFC circuit in accordance with the prior art, embodied as a step-down converter;

DETAILED DESCRIPTION OF THE PREFERRED EMBODIMENTS

Figure 3:
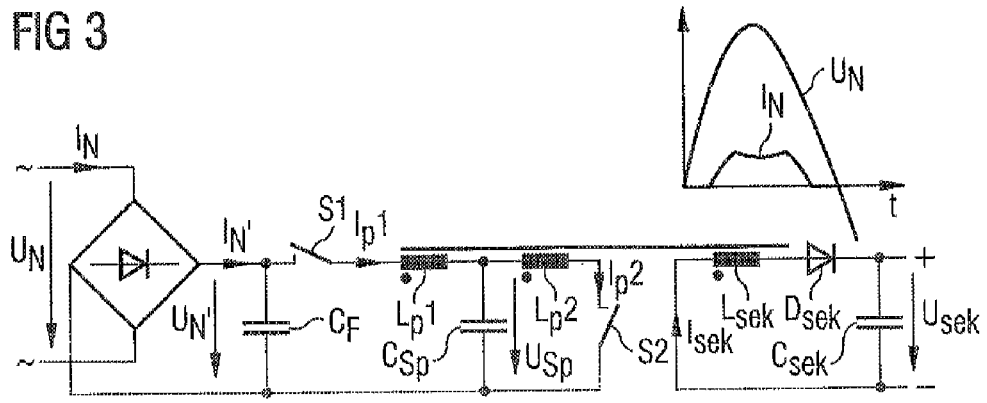
FIG. 3 shows an exemplary embodiment of a converter in accordance with the invention.

FIGS. 1-3 show conventional PFC circuits that convert an input alternating voltage into a direct voltage of an intermediate circuit. In a passive circuit (FIG. 1), a sufficiently large inductor L is arranged upstream of a rectifier unit. In this way, the current flow angle is increased in comparison to the original current characteristic curve $I_N^*$, although a phase shift occurs which needs to be taken into account.

The active circuits (FIGS. 2a and 2b) comprise a clocked switch S by which the phase angle of the current $I_N$ can be influenced in addition to the current flow angle.

The converter shown in FIG. 3 includes an input-side rectifier bridge that is connected to an alternating voltage $U_N$ and converts an alternating current $I_N$ into a rectified current $I_N$. Connected downstream of the rectifier bridge is a filter capacitor $C_F$ that is dimensioned so as to be small in relation to the frequency of the alternating voltage $U_N$. The filter capacitor $C_F$ can advantageously also be arranged upstream of the rectifier bridge, thereby precluding charging as a result of a backflow of energy from the converter.

The converter further comprises a transformer having two primary windings $L_p1$, $L_p2$ and a secondary winding $L_{sec}$. The start of the first primary winding $L_p1$ is connected by a first switch S1 to the output of the rectifier bridge. With the first switch S1 closed, a first primary current $I_p1$ flows through the first primary winding $L_p1$. The end of the first primary winding $L_p1$ is connected to the start of the second primary winding $L_p2$, with a connecting point between the primary windings $L_p1$, $L_p2$ being connected to a terminal of a storage capacitor $C_{Sp}$. The second terminal of the storage capacitor $C_{Sp}$ is connected to a primary-side reference potential.

The end of the second primary winding $L_p2$ is likewise connected to the reference potential by a second switch S2, such that the series circuit consisting of second primary winding $L_p2$ and second switch S2 is connected in parallel with the storage capacitor $C_{Sp}$. With the second switch S2 closed, a second primary current $I_p2$ flows through the second primary winding $L_p2$.

A coupling between the primary windings $L_p1$, $L_p2$ and the secondary winding $L_{sec}$ exists by way of a core of the transformer. The voltage induced in the secondary winding $L_{sec}$ produces a secondary-side current $I_{sec}$ which charges a secondary-side output capacitor $C_{sec}$ by a rectifier diode $D_{sec}$. The output voltage $U_{sec}$ is present at said output capacitor $C_{sec}$.

The converter produces a characteristic curve of the input-side current $I_N$ such that for a brief period no current $I_N$ flows only in the region of the zero crossings of the alternating voltage $U_N$. There between the current $I_N$ increases, a reduction of the current $I_N$ occurring in the region of the highest voltage $U_N$, with the result that the current path overall has a flattened characteristic curve. The current draw from a power grid connected on the input side consequently is not realized in the form of a grid-synchronous sine function, although current peaks are avoided and the current flow angle is greatly expanded. As a result, current harmonics remain below required limit values.

Figure 4:
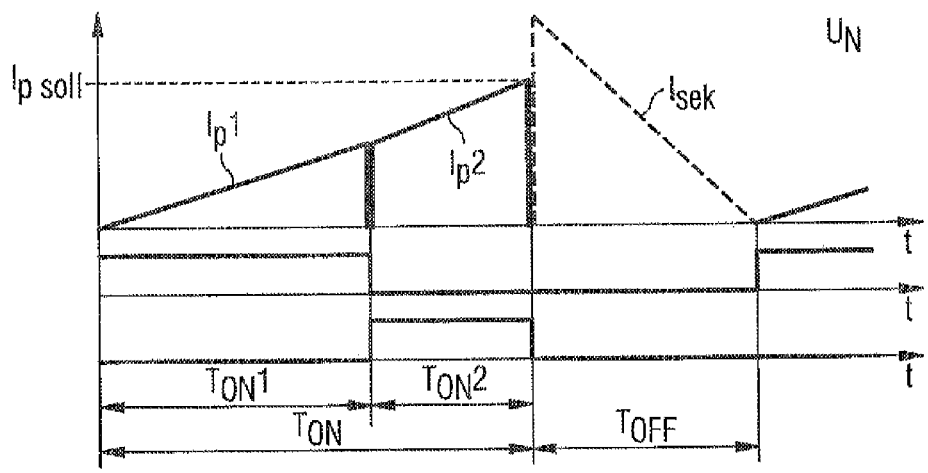
FIG. 4 shows a current diagram with switching states of the switches in accordance with the invention.

The current characteristic curves shown in FIG. 4 result from the regulation of the converter. A secondary-side voltage regulation predetermines a threshold value $I_p$ for the primary-side current $I_p1$ or $I_p2$. The first switch S1 is turned on at the start of a charging phase. The first primary current $I_p1$ through the first primary winding $L_p1$ increases until the first switch S1 is turned off again after a turn-on time $T_{ON}1$ predetermined by a second regulatory circuit. In this case, the second regulatory circuit determines the voltage level of the storage capacitor $C_{Sp}$ and keeps this constant on average.

The second switch S2 is turned on at the same time that the first switch S1 is turned off. It is of advantage in this case to make provision if anything for a slight overlap rather than a time gap between the turn-on states. During the turn-on time $T_{ON}2$ of the second switch S2 the second primary current $I_p2$ flows through the second primary winding $L_p2$ and increases until the predetermined threshold value $I_{p\ setpoint}$ is reached. The charging phase is then terminated by the second switch S2 being turned off.

In the following blocking phase, during which both switches S1, S2 remain turned off for a turn-off time $T_{OFF}$, a secondary current drop $I_{sec}$ flows through the secondary winding $L_{sec}$ of the transformer and charges the output capacitor $C_{sec}$.

In order to regulate the turn-on time $T_{ON}$, it is advantageous if the input voltage $U_N$ is averaged and the current threshold value $I_{p\ setpoint}$ is predetermined as a pilot control value of the regulation by a sliding window over one half-wave in each case. A comb filter is accordingly provided for the power grid frequency and harmonics.

In this case, the turn-on time $T_{ON}$ is beneficially derived from the current threshold value $I_{p\ setpoint}$, taking into account the linear relationship given by the output power. An I controller is used only for a residual deviation from the storage capacitor voltage $U_{Sp}$.

Figure 5:
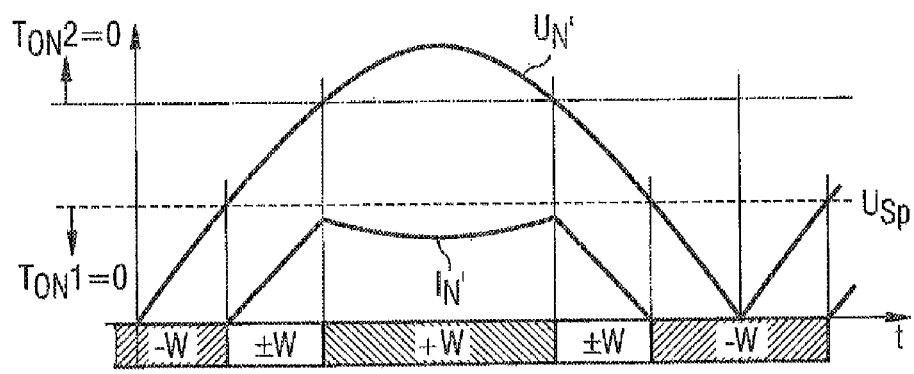
FIG. 5 shows characteristic curves of the input current and the input voltage in accordance with the invention.

FIG. 5 shows the characteristic curve of the rectified input voltage $U_N$, and of the current $I_N$, at a stable load point. Shown therein are the possible time spans in which energy W is either drawn from or supplied to the storage capacitor $C_{Sp}$. At a stable load point, given a suitable setting of the maximum turn-on time $T_{ON}1$ of the first switch S1, an equalized energy balance is produced in the storage capacitor $C_{Sp}$. In those phases in which the input-side voltage $U_N$, is less than the voltage $U_{Sp}$ at the storage capacitor $C_{Sp}$, the energy is drawn entirely from the storage capacitor $C_{Sp}$. If the input-side voltage $U_{N'}$ becomes greater than the capacitor voltage $U_{Sp}$, the energy is drawn initially both from a power grid connected on the input side and from the storage capacitor $C_{Sp}$. The corresponding current characteristic curve is shown in FIG. 4. If the input-side voltage $U_{N'}$ increases further, the energy is drawn in its entirety from the power grid, where the current threshold value $I_{p\ setpoint}$ predetermined by the secondary-side voltage regulation is reached already within the turn-on time $T_{ON}1$ of the first switch.

The desired voltage $U_{Sp}$ at the storage capacitor $C_{Sp}$ is predetermined in accordance with strategic considerations. Criteria applied here are a reduction in the voltage at the first switch S1, use of the stored energy for bridging power grid outages, optimization of the current flow angle, controlled powerup at turn-on time or optimization of the switching conditions for voltageless switching.

Figure 6:
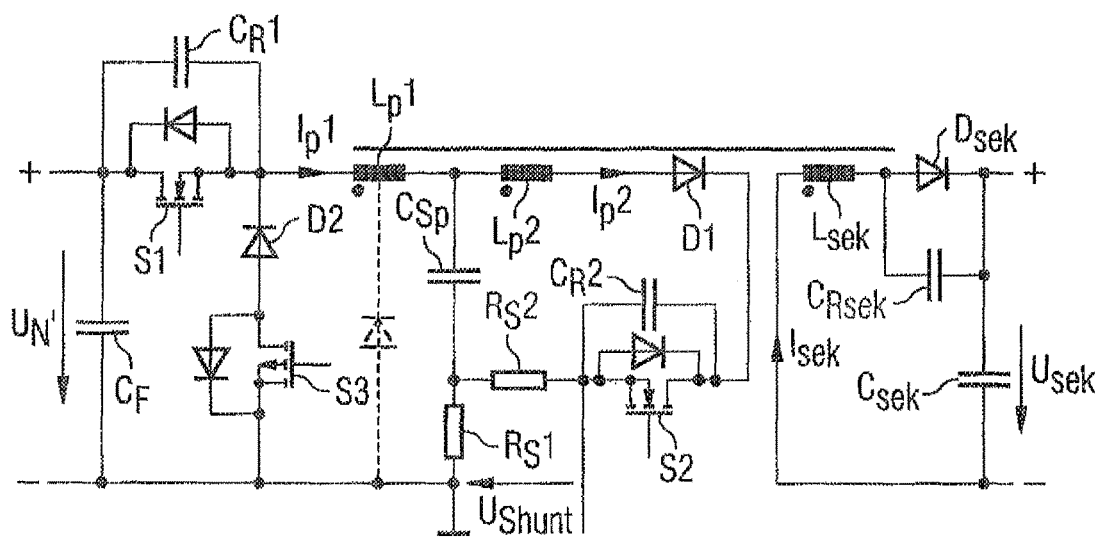
FIG. 6 shows an exemplary embodiment in accordance with the PFC circuit of FIG. 3 with switches embodied as MOSFETs.

A practical implementation of a converter according to FIG. 3 is shown in FIG. 6. With switches S1, S2 embodied as MOSFETs, consideration must be given specifically to their technology-imposed parallel diodes. This is necessary in particular in series with the second switch S2 to prevent a short circuit of the second primary winding $L_p2$ during powerup. During powerup, the storage capacitor voltage $U_{Sp}$ is still almost zero or very small compared to the differential voltage between input-side voltage $U_{N'}$ and storage capacitor voltage $U_{Sp}$. A first diode D1 is therefore provided, the cathode of which is connected to the cathode of the parallel diode in the second switch S2.

A freewheeling diode D2 can be provided to accelerate the startup response. This is advantageously realized as switchable by a third switch S3, because otherwise the boundary conditions for the dimensioning of the transformer can become very unfavorable. Without such a measure, the storage capacitor voltage $U_{Sp}$ would always have to be greater than the secondary voltage $U_{sec}$ transformed back onto the primary side. Operation at a low input voltage $U_N$ in particular would be restricted.

Alternatively to a switchable freewheeling diode D2, the first primary winding $L_p1$ can be tapped by a freewheeling path. Another possibility is to provide a freewheeling path with an auxiliary winding, where the auxiliary winding and the first primary winding $L_p1$ are magnetically coupled.

An arrangement of current-sensing resistors $R_S1$, $R_S2$ at which a measurement voltage $U_{Shunt}$ drops is provided to simplify the regulation of the primary current. This enables the primary-side current $I_p$, which flows either as first primary current $I_p1$ through the capacitor $C_{Sp}$ and a first current-sensing resistor $R_S1$, or flows as second primary current $I_p2$ through the second switch S2 and a second current-sensing resistor $R_S2$, to be detected without mutual interference using only one comparator. With a favorable dimensioning of the current current-sensing resistors $R_S1$, $R_S2$, it is also possible to compensate for a difference in the number of turns of the two primary windings $L_p1$, $L_p2$.

The input-side filter capacitor $C_F$ is dimensioned in size such that during a switching period of the converter having a duration of approx. 3-20 µs, the voltage at the capacitor $C_F$ no longer drops by more than a predetermined voltage value (e.g. 10V). Thus, a small filter capacitor $C_F$ having a capacitance of a few microfarads is adequate for providing an input-side voltage $U_{N'}$ having sufficient rigidity for the converter. In combination with a power grid filter optimized to the switching frequency and disposed upstream of the input-side rectification elements, this also fulfills the requirements in respect of the filtering of high-frequency power grid interference.

Resonant capacitors $C_R1$, $C_R2$, $C_{Rsec}$ are provided in parallel with the first and second switch S1, S2 and the secondary-side rectifier diode $D_{sec}$ to enable quasi-resonant switching operation.

Figure 7:
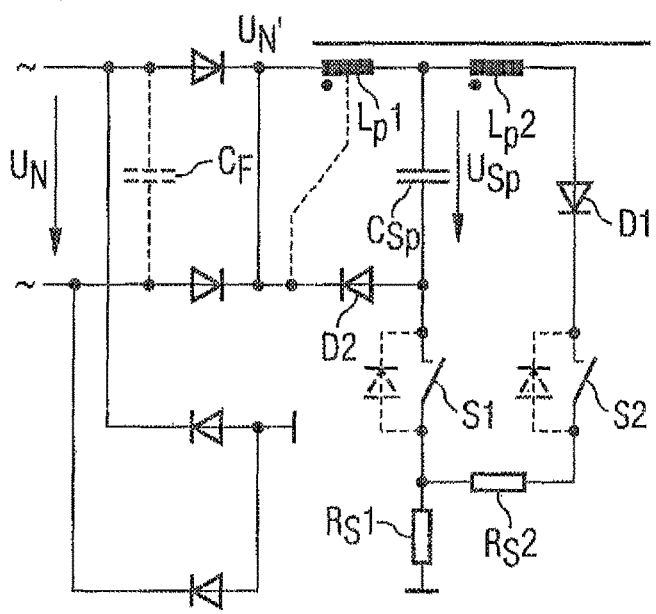
FIG. 7 shows an alternative exemplary embodiment of a converter in accordance with the invention.

An alternative implementation of the converter primary side is shown in FIG. 7. An input alternating voltage $U_N$ is present on the input side. The conductor and neutral conductor of the alternating voltage are optionally connected by an input-side filter capacitor $C_F$. Connected downstream of the filter capacitor $C_F$ are two rectifier diodes. The conductor and neutral conductor are also connected to a reference potential by two further rectifier diodes.

Referenced to the reference potential, the first primary winding $L_p1$, the second primary winding $L_p2$, a first diode D1, the second switch S2 and current current-sensing resistors $R_S2$, $R_S1$ are connected in series to the rectified input voltage $U_{N'}$.

The first diode D1 is required on account of a parallel diode in the second switch S2.

A first terminal of the storage capacitor $C_{Sp}$ is connected to a connecting point between first and second primary winding $L_p1$, $L_p2$. The second terminal of the storage capacitor $C_{Sp}$ is led back to the rectified input voltage by a freewheeling diode D2. Alternatively thereto, the freewheeling the freewheeling path can also tap the first primary winding $L_p1$.

The second terminal of the storage capacitor $C_{Sp}$ is also connected to the reference potential by the first switch and a first current-sensing resistor $R_S1$. Both switches S1, S2 are accordingly arranged on the ground side. In this case, the first switch S1 can remain turned on even when the second switch S2 is turned on.

With a turns ratio N1 of the first primary winding $L_p1$ to the secondary winding $L_{sec}$ and a number of turns ratio N2 of the second primary winding $L_p2$ to the secondary winding $L_{sec}$, the following maximum voltage results at the second switch S2:

$$U_{S2}\text{max} = U_{N'} + U_{sec}(N1+N2) \text{ and}$$

$$U_{S2}\text{max} = U_{N'} + U_{Sp}(N2/N1+1).$$

For controlled charging of the storage capacitor $C_{Sp}$ it is favorable if the first switch S1 is connected as an analog current sink. A transition to the switching mode of operation does not occur until the voltage at the capacitor CSp has reached a minimum operating point. Here, the objective is to obtain a continuous rampup of the secondary voltage $U_{sec}$.

Figure 8:
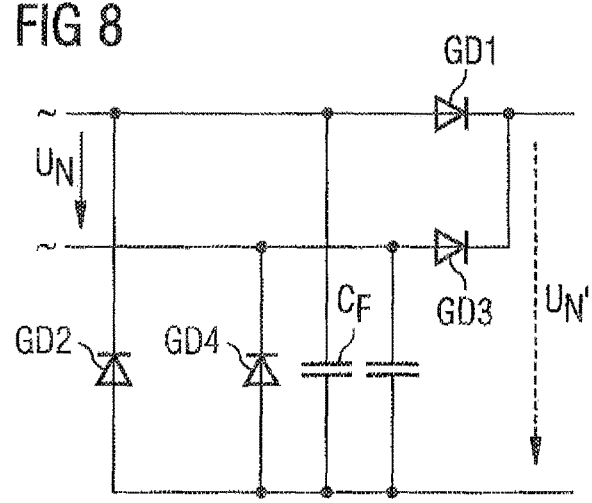
FIG. 8 shows an exemplary embodiment of input-side rectifier elements in accordance with the invention.

An alternative filter capacitor circuit for avoiding reverse charges into a filter capacitor $C_F$ is shown in FIG. 8. Such a circuit is beneficial for all contemplated embodiments in accordance with the invention. The conductor of an input alternating voltage is connected to the anode of a first rectifier diode GD1 and to the cathode of a second rectifier diode GD2. The neutral conductor of the input alternating voltage is connected to the anode of a third rectifier diode GD3 and to the cathode of a fourth rectifier diode GD4. The cathodes of the first rectifier diode GD1 and the third rectifier diode GD3 are connected to each other. The rectified input voltage $U_{N'}$, referenced to a reference potential, is present at the connection. The anodes of the second rectifier diode GD2 and the fourth rectifier diode GD4 are connected to the reference potential. A filter capacitor $C_F$ is arranged in each case between reference potential and conductor and between reference potential and neutral conductor.

Figure 9:
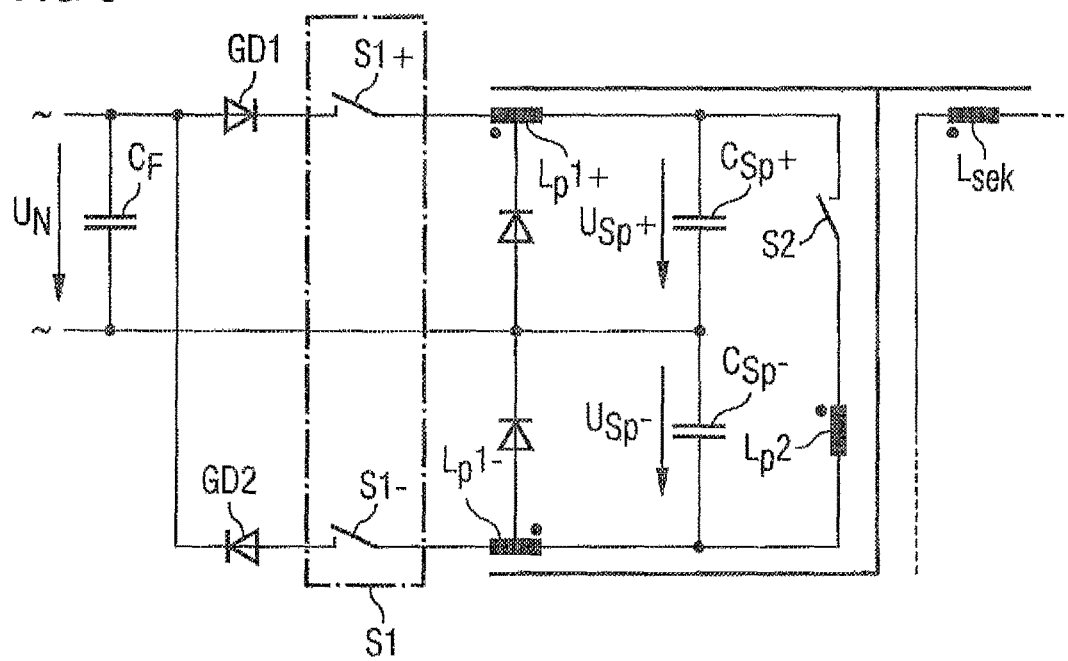
FIG. 9 shows an alternative exemplary embodiment of a converter the invention having only two input-side rectifier diodes.

A further embodiment of the converter primary side having a simplified rectifier circuit is shown in FIG. 9. The conductor of an input-side alternating voltage $U_N$ is connected to the anode of a first rectifier diode GD1 and to the cathode of a second rectifier diode GD2. The first primary winding $L_p1$ is subdivided into a first part-winding $L_p1+$ and a second part-winding $L_p1-$. The first switch also comprises two switching elements S1+, S1−.

The first switching element S1+, the first part-winding $L_p1+$ and a first storage capacitor $C_{Sp}+$ are connected in series between the cathode of the first rectifier diode GD1 and the neutral conductor of the input-side alternating voltage $U_N$. The second switching element S2+, the second part-winding $L_p1-$ and a second storage capacitor $C_{Sp}-$ are connected in series between the anode of the second rectifier diode GD2 and the neutral conductor.

The second primary winding $L_p2$ is connected in series with the second switch S2 to the storage capacitors $C_{Sp}+$, $C_{Sp}-$ which are thus arranged in series. It is important to bear in mind here that the voltages $U_{Sp}+$, $U_{Sp}-$ of the capacitors $C_{Sp}+$, $C_{Sp}-$ are regulated in each case.

In each case, a freewheeling path that taps the respective part-winding $L_p1+$ or $L_p1-$ can be provided in each case for the part-windings $L_p1+$, $L_p1-$ of the first primary winding $L_p1$.

Alternatively to the arrangement shown in FIG. 9, the first switch S1 can also be arranged in the base point of the storage capacitors $C_{Sp}+$, $C_{Sp}-$.

The converter implementations shown are in no way limiting and merely constitute possible specific embodiments of a converter in accordance with the invention. Furthermore, individual functional units (e.g., the rectification elements of FIG. 8) which are described only with reference to one of the embodiment variants are applicable analogously to other embodiment.

Figure 10:
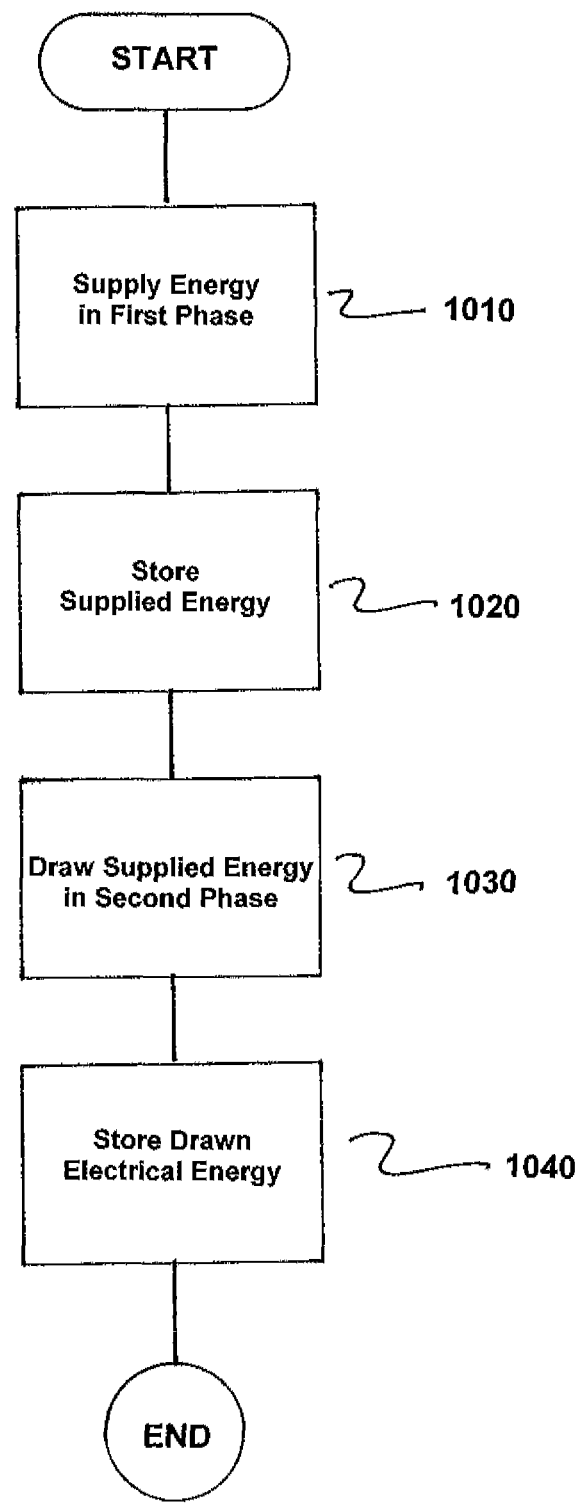
FIG. 10 is a flow chart of the method in accordance with an embodiment of the invention.

FIG. 10 is a flowchart of a method for operating a converter to convert an input-side alternating voltage into an output-side direct voltage, where the converter comprises a transformer having at least two primary windings arranged in series, a first switch, a second switch, rectification elements and a storage capacitor unit arranged in series with a first primary winding of the at least two primary windings. The method comprises supplying, through a first primary winding of the plurality of primary windings, electrical energy on an input-side of the converter in a first charging phase of an operating cycle, as indicated in step 1010.

The supplied electrical energy is stored in the transformer and the storage capacitor unit, as indicated in step 1020.

Electrical energy from the storage capacitor unit is drawn through a second primary winding of the at least two primary windings in a second charging phase, as indicated in step 1030.

The electrical energy drawn in the second charging phase from the storage capacitor unit is stored in the transformer, as indicated in step 1040.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A converter for converting an input-side alternating voltage into an output-side direct voltage, wherein a power factor correction is provided, the converter comprising:
   a transformer having at least two primary windings arranged in series;
   a first switch;
   a second switch;
   rectification elements; and
   a storage capacitor unit arranged in series with a first primary winding of the at least two primary windings;
   wherein the storage capacitor unit is connectable in a clocked manner to the input-side alternating voltage by the rectification elements by the first switch and a second primary winding of the at least two primary windings is connectable in the clocked manner to the storage capacitor unit by the second switch.

2. The converter as claimed in claim 1, further comprising:
   a filter capacitor unit connected to a conductor of the alternating voltage; wherein the rectification elements are arranged downstream of the filter capacitor unit.

3. The converter as claimed in claim 2, wherein the transformer includes at least one secondary winding to which an output capacitor is connected by a secondary-side rectifier circuit.

4. The converter as claimed in claim 1, wherein the transformer includes at least one secondary winding to which an output capacitor is connected by a secondary-side rectifier circuit.

5. The converter as claimed in claim 1, wherein the first switch is arranged in series with a series circuit consisting of the first primary winding of the at least two primary windings and the storage capacitor unit; and wherein the second switch is arranged in series with the second primary winding of the at least two primary windings.

6. The converter as claimed in claim 1, wherein a connection between the at least two primary windings is connected to a first terminal of the storage capacitor unit, a second terminal of the storage capacitor unit is connected to a reference potential.

7. The converter as claimed in claim 6, wherein the series circuit consisting of the second primary winding of the at least two primary windings and the second switching element is arranged in parallel with the storage capacitor unit.

8. The converter as claimed in claim 1, further comprising:
   a freewheeling diode arranged in parallel with a series circuit consisting of the first primary winding of the at least two primary windings and the storage capacitor unit; and
   wherein the storage capacitor unit is connected in series with a first current-sensing resistor by the first switch to a reference potential; and
   wherein the second primary winding is connected in series with the first current-sensing and a second current-sensing resistor by the second switch to the reference potential.

9. The converter as claimed in claim 1, further comprising:
   a first rectifier element; and
   a second rectifier element;
   wherein the first switch comprises a first and a second switching element;

wherein the first primary winding is subdivided into a first and a second part-winding;

wherein the first part-winding is connected to the alternating voltage in series with the first switching element and with a positively charged storage capacitor by the first rectifier element; and wherein the second part-winding is connected to the alternating voltage in series with the second switching element and a negatively charged storage capacitor by the second rectifier element.

10. The converter as claimed in claim 1, further comprising:

a third switching element arranged in a freewheeling path of the first primary winding of the at least two primary windings.

11. A method for operating a converter to convert an input-side alternating voltage into an output-side direct voltage, the converter comprising a transformer having at least two primary windings arranged in series, a first switch, a second switch, rectification elements and a storage capacitor unit arranged in series with a first primary winding of the at least two primary windings, the method comprising:

supplying, through a first primary winding of the plurality of primary windings, electrical energy on an input-side of the converter in a first charging phase of an operating cycle;

storing the supplied electrical energy in the transformer and the storage capacitor unit;

drawing, through a second primary winding of the at least two primary windings, electrical energy from the storage capacitor unit in a second charging phase; and storing the electrical energy drawn in the second charging phase from the storage capacitor unit in the transformer;

wherein the storage capacitor unit is connected in a clocked manner to the input-side alternating voltage by the rectification elements to the first switch and a second primary winding of the at least two primary windings is connected in the clocked manner to the storage capacitor unit by the second switch.

12. The method as claimed in claim 11, during a charging phase the first switch is initially turned on and the second switch is turned off and subsequently the second switch is turned on and the first switch is turned off, and the second switch remains turned on until a time at which a current through the second switching element reaches a predetermined threshold value.

13. The method as claimed in claim 12, further comprising:

regulating a ratio of turn-on times of the first and second switches such that a mean voltage at the storage capacitor unit remains constant.

14. The method as claimed in claim 11, further comprising:

regulating a ratio of turn-on times of the first and second switches such that a mean voltage at the storage capacitor unit remains constant.

* * * * *